United States Patent
Baldwin et al.

(10) Patent No.: US 9,267,417 B2
(45) Date of Patent: Feb. 23, 2016

(54) DIFFUSER PLATE

(71) Applicant: Faurecia Emissions Control Technologies USA, LLC, Columbus, IN (US)

(72) Inventors: Steven R. Baldwin, Troy, MI (US); Syed Saleem Quadri, Belgaluri (IN)

(73) Assignee: Faurecia Emissions Control Technologies USA, LLC, Columbus, IN (US)

( * ) Notice: Subject to any disclaimer, the term of this patent is extended or adjusted under 35 U.S.C. 154(b) by 0 days.

(21) Appl. No.: 14/068,047

(22) Filed: Oct. 31, 2013

(65) Prior Publication Data

US 2015/0113967 A1    Apr. 30, 2015

(51) Int. Cl.
| | |
|---|---|
| *F01N 1/00* | (2006.01) |
| *F01N 13/08* | (2010.01) |
| *F01N 3/28* | (2006.01) |
| *F01N 13/10* | (2010.01) |

(52) U.S. Cl.
CPC .............. *F01N 13/08* (2013.01); *F01N 3/2892* (2013.01); *F01N 13/10* (2013.01); *F01N 2240/20* (2013.01); *F01N 2560/025* (2013.01)

(58) Field of Classification Search
USPC ........... 60/272, 286, 295, 299, 300, 301, 303, 60/323, 324; 422/177, 179, 180
See application file for complete search history.

(56) References Cited

U.S. PATENT DOCUMENTS

| | | | |
|---|---|---|---|
| 645,812 A | 12/1899 | Hoffman | |
| 2,900,962 A | 8/1959 | Ingres | |
| 5,183,976 A * | 2/1993 | Plemons, Jr. | ................. 181/264 |
| 5,185,998 A | 2/1993 | Brew | |
| 5,220,789 A | 6/1993 | Riley et al. | |
| 5,950,925 A | 9/1999 | Fukunaga et al. | |
| 6,449,947 B1 | 9/2002 | Liu et al. | |
| 6,555,070 B1 * | 4/2003 | Kruger | .......................... 422/179 |
| 6,722,123 B2 | 4/2004 | Liu et al. | |
| 7,793,490 B2 | 9/2010 | Amon et al. | |
| 8,136,770 B2 * | 3/2012 | Beatty et al. | ..................... 248/58 |
| 8,141,353 B2 * | 3/2012 | Zheng et al. | ................... 60/324 |
| 8,181,671 B2 | 5/2012 | Butler | |

(Continued)

FOREIGN PATENT DOCUMENTS

| | | |
|---|---|---|
| DE | 10123358 A1 | 11/2002 |
| DE | 102008031136 A1 | 1/2010 |

(Continued)

OTHER PUBLICATIONS

PCTUS2013/036706, filed Apr. 16, 2013.

(Continued)

*Primary Examiner* — Binh Q Tran
(74) *Attorney, Agent, or Firm* — Carlson, Gaskey & Olds, PC

(57) ABSTRACT

A diffuser plate for a vehicle exhaust system comprises a body having a primary opening and a plurality of secondary openings circumferentially spaced apart from each other about the primary opening. In one example, the diffuser plate is positioned between an exhaust manifold and a catalytic converter. Exhaust gas from the exhaust manifold flows through the primary and secondary openings in the diffuser plate to provide a thorough mixed flow that is evenly distributed across an inlet to a catalyst substrate, and also enable an oxygen sensor to accurately measure engine cylinder exhaust gas chemistry.

19 Claims, 7 Drawing Sheets

(56) References Cited

U.S. PATENT DOCUMENTS

| | | |
|---|---|---|
| 8,375,703 B2 | 2/2013 | Hayashi et al. |
| 8,539,761 B2 * | 9/2013 | Lebas et al. .................. 60/324 |
| 2007/0101703 A1 * | 5/2007 | Kanaya et al. ................ 60/286 |
| 2009/0107761 A1 | 4/2009 | Marocco |
| 2010/0212301 A1 * | 8/2010 | De Rudder et al. ........... 60/299 |
| 2011/0061369 A1 * | 3/2011 | Yetkin et al. .................. 60/282 |
| 2011/0239631 A1 * | 10/2011 | Bui et al. ...................... 60/295 |
| 2012/0144812 A1 | 6/2012 | Hyun |
| 2012/0151902 A1 | 6/2012 | Yi et al. |
| 2013/0277143 A1 | 10/2013 | Bogard |

FOREIGN PATENT DOCUMENTS

| | | |
|---|---|---|
| EP | 0555746 A1 | 8/1993 |
| EP | 1719884 A1 | 11/2006 |
| EP | 2562429 | 2/2013 |
| FR | 2900962 A1 | 11/2007 |
| FR | 2957119 A1 | 9/2011 |
| WO | 03036056 | 1/2003 |
| WO | 2010078052 A1 | 7/2010 |
| WO | 2012123660 A1 | 9/2012 |

OTHER PUBLICATIONS

International Search Report and Written Opinion for PCT Application No. PCT/US2014/062492, mailed Dec. 23, 2014.

* cited by examiner

DIFFUSER PLATE

TECHNICAL FIELD

The subject invention relates to a diffuser plate for a vehicle exhaust system.

BACKGROUND OF THE INVENTION

Exhaust systems are widely known and used with combustion engines. Typically, an exhaust system includes exhaust tubes or pipes that convey hot exhaust gases from an engine exhaust manifold to other downstream exhaust system components, such as catalytic converters, mufflers, resonators, etc. As known, a catalytic converter converts toxic by-products of the exhaust gases to less toxic substances by way of catalysed chemical reactions. The catalytic converter includes a substrate positioned within a housing that has an exhaust gas inlet and an exhaust gas outlet. As the exhaust gas flows through the substrate, pollutants such as carbon monoxide, unburned hydrocarbon, and oxides of nitrogen are converted to less toxic substances such as carbon dioxide and water, for example.

It is known to use mixing elements positioned upstream of the catalytic converter in an attempt to efficiently direct exhaust flow into the substrate. While these plates have proved effective, there is always a need to further increase emission conversion efficiency.

SUMMARY OF THE INVENTION

In one example embodiment, a diffuser plate for a vehicle exhaust system comprises a body having a primary opening and a plurality of secondary openings circumferentially spaced apart from each other about the primary opening. In one example, the diffuser plate is positioned between an exhaust manifold and a catalytic converter. Exhaust gas from the exhaust manifold flows through the primary and secondary openings in the diffuser plate to provide a thorough mixed flow that is evenly distributed across an inlet to a catalyst substrate.

In a further embodiment of the above, the body of the diffuser plate comprises a ring-shaped body.

In a further embodiment of any of the above, the primary opening comprises a single center opening that defines a center axis, and the plurality of secondary openings comprise a plurality of louvers that are circumferentially spaced apart from each other about the center axis.

In a further embodiment of any of the above, the ring-shaped body includes an upstream face configured to face an exhaust gas manifold and a downstream face configured to face a catalyst substrate, and wherein the primary and secondary openings cooperate to define a plurality of exhaust gas flow paths from the exhaust gas manifold to the catalyst substrate.

In a further embodiment of any of the above, the diffuser plate includes a flange formed about a periphery of the ring-shaped body and extending in a downstream direction.

In a further embodiment of any of the above, the diffuser plate includes a plurality of legs extending from the flange in a downstream direction.

In another exemplary embodiment, a vehicle exhaust system includes an exhaust manifold having a plurality of ports configured to receive exhaust gases from an engine, and a catalytic converter with a housing having an inlet end configured for attachment to an outlet of the exhaust manifold. The housing defines an internal cavity. A substrate is positioned within the internal cavity. A diffuser plate is positioned upstream of the substrate and has a primary opening and a plurality of secondary openings circumferentially spaced apart from each other about the primary opening.

In a further embodiment of any of the above, the diffuser plate includes a flange formed about a periphery of the ring-shaped body and includes a plurality of legs that are fixed to an inner surface of the exhaust manifold such that an outer periphery of the flange is spaced radially inward of the inner surface.

In a further embodiment of any of the above, the plurality of louvers extend outwardly from the ring-shaped body in the downstream direction such that depressions are formed in the upstream face and corresponding protrusions are formed in the downstream face.

DETAILED DESCRIPTION

Figure 1:
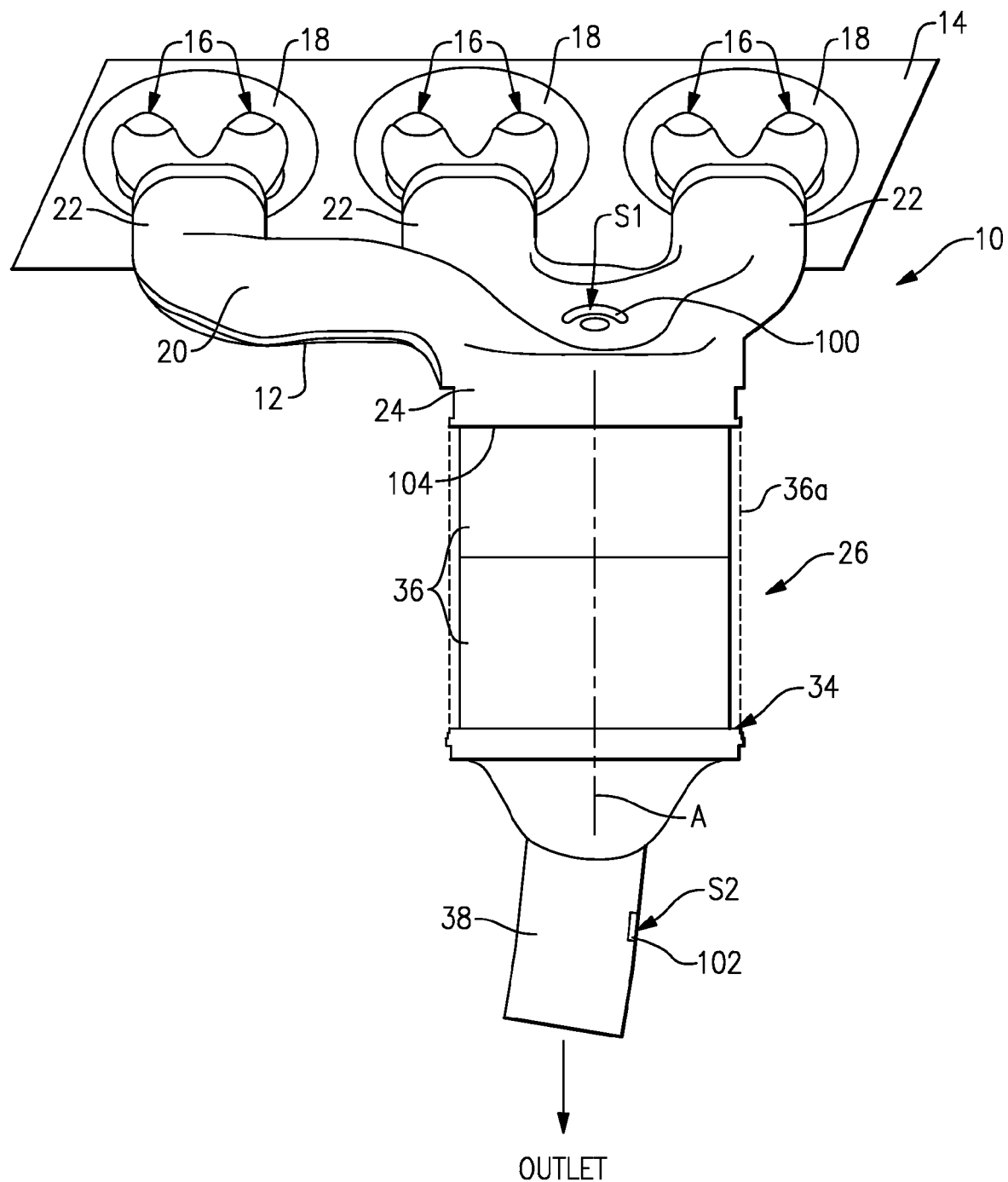
FIG. 1 is a side view of an exhaust component assembly incorporating the subject invention.

FIG. 1 shows an exhaust component assembly 10 for a vehicle exhaust system. The exhaust component assembly 10 includes an exhaust manifold 12 that receives exhaust gases from a vehicle engine 14 via a plurality of ports 16. Each port 16 is associated with one engine cylinder 18 as known. In the example shown in FIG. 1, the engine 14 is a six cylinder engine with the manifold 12 being associated with a right side set of cylinders 18. Another manifold, similarly configured to that shown in FIG. 1, is associated with a left side set of cylinders.

The manifold 12 is comprised of an outer shell or housing 20 having a plurality of branch portions 22 that extend to a common outlet 24. Each branch portion 22 is associated with one of the ports 16. The outlet 24 directs the exhaust gases to a downstream exhaust component, such as a catalytic converter 26 for example. The catalytic converter 26 includes an outer housing 28 (FIG. 2) that extends between a first end 30 and a second end 32. The outer housing 28 defines an internal cavity 34 that houses one or more substrates 36 as shown in FIG. 1. In certain configurations, the substrates may be wrapped with an insulating mat (see optional mat 36a in FIG. 1). The catalytic converter 26 defines a center axis A that extends from the first end 30 to the second end 32.

The outlet 24 of the manifold 12 is configured to be attached to the first end 30 of the outer housing 28. An outlet pipe 38 is attached to the second end 32 of the outer housing 28. The outlet pipe 38 directs the exhaust gases to downstream exhaust components as known.

Figure 2:
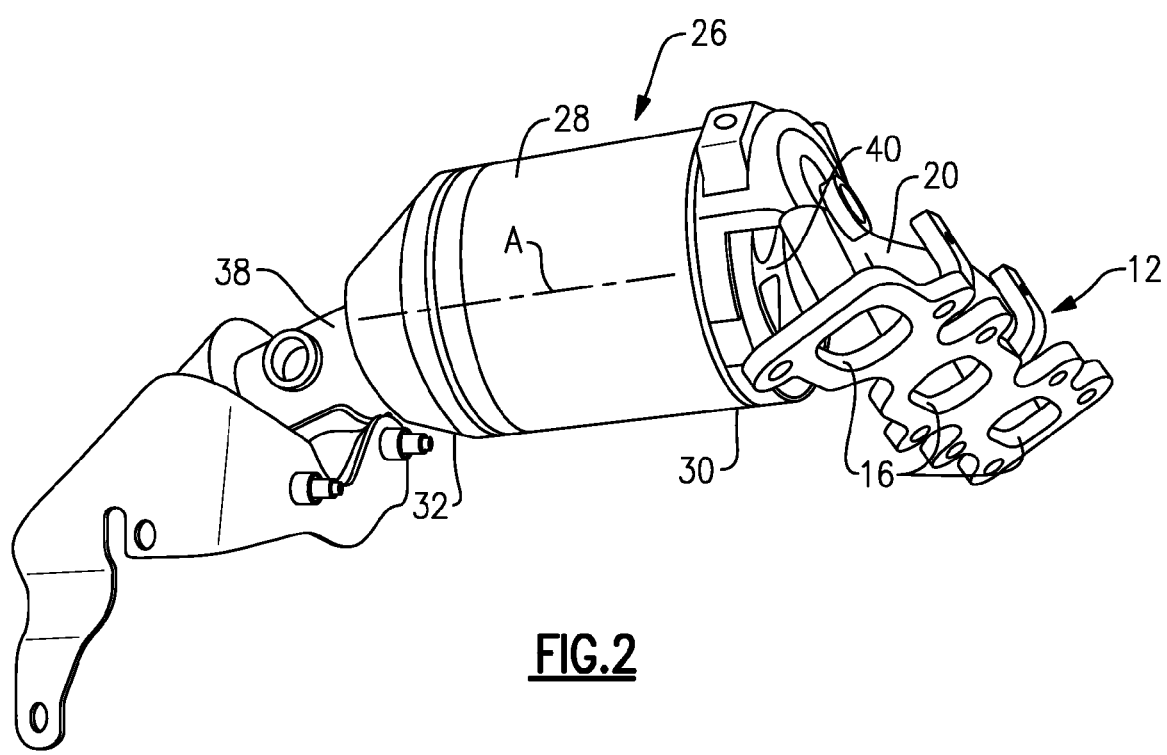
FIG. 2 is a perspective view of the exhaust component assembly of FIG. 1 partially cut-away to show a diffuser plate.

The exhaust component assembly 10 includes a diffuser plate 40 that is positioned upstream of the substrate 36 of the catalytic converter 26 as shown in FIG. 2. In one example, the diffuser plate 40 comprises a ring-shaped body 42 (FIG. 3)

that has a primary opening 44 and a plurality of secondary openings 46 that are circumferentially spaced apart from each other about the primary opening 44. In the example shown, the primary opening 44 comprises a single center opening and the plurality of secondary openings 46 are formed via a plurality of louvers 48.

The primary opening 44 defines a center axis that is common with the center axis A defined by the catalytic converter 26. The ring-shaped body 42 is defined by an inner periphery 50 (which forms the primary opening 44) and an outer periphery 52. The material between the inner 50 and outer 52 forms the ring-shape and includes the louvers 48.

Figure 3:
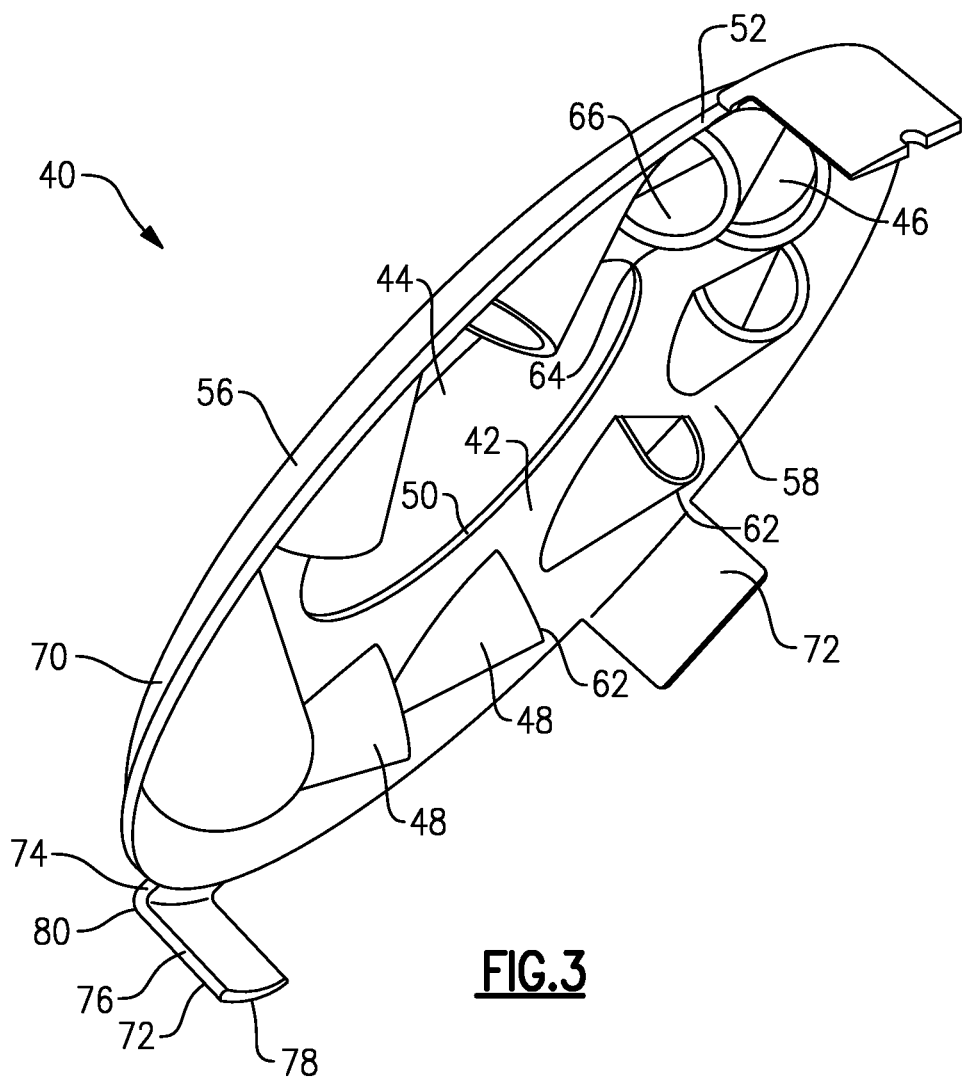
FIG. 3 is a perspective view of a downstream side of the diffuser plate of FIG. 2.
Figure 4:
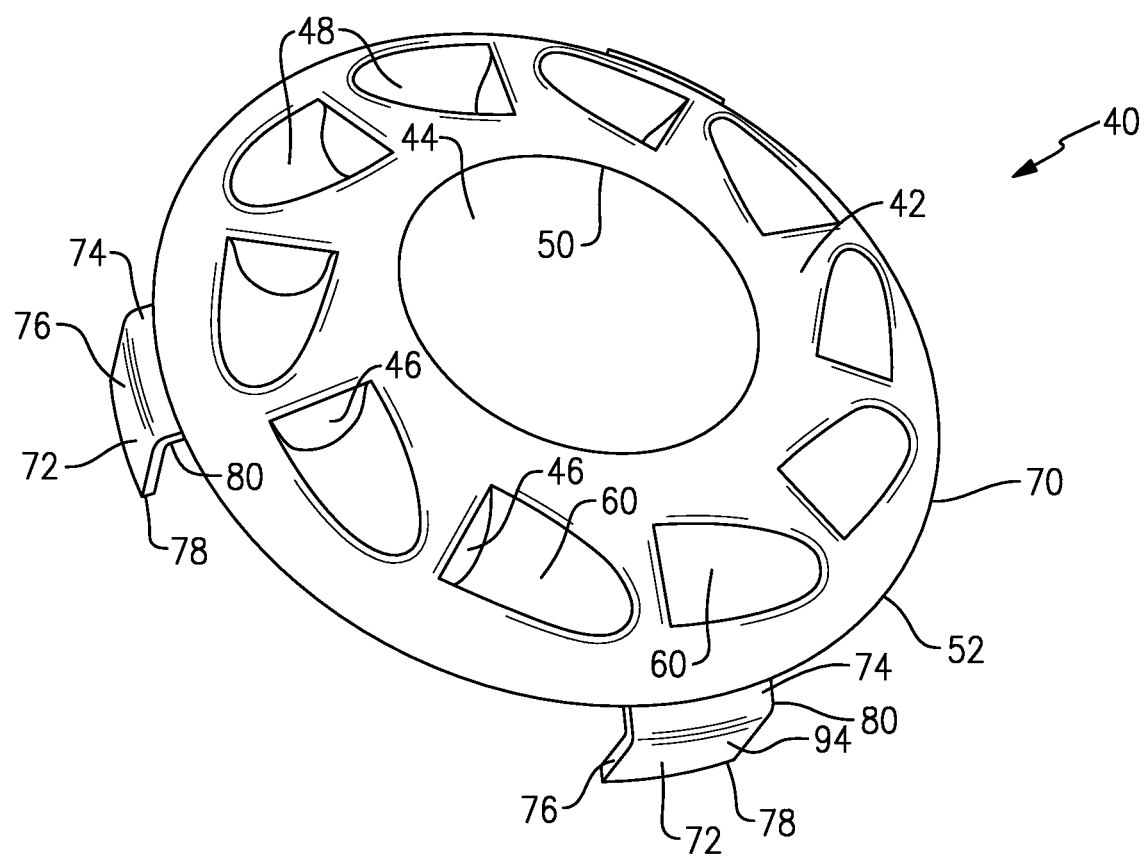
FIG. 4 is a perspective view of an upstream side of the diffuser plate of FIG. 2.

The plurality of louvers 48 are circumferentially spaced apart from each other about the center axis A as shown in FIGS. 3 and 4. Each louver 48 defines a unique flow direction compared to the other louvers 48. The center primary opening 44 defines an axial flow path for the exhaust gases and the louvers 48 define a plurality of generally tangential flow paths that are tangential in a direction relative to the inner periphery 50 of the body 42. The louvers 48 introduce a swirl to the exhaust gas stream that mixes with the axial flow to allow equal distribution of exhaust gas across the substrate 36, creating equal mass flow rates through the substrate.

The ring-shaped body 42 includes an upstream face 56 that faces the exhaust gas manifold 12 and a downstream face 58 that faces the catalyst substrate 36. The primary opening 44 and louver openings 46 cooperate to define a plurality of exhaust gas flow paths from the exhaust gas manifold 12 to the catalyst substrate 36. Each louver 48 extends outwardly from the ring-shaped body 42 in the downstream direction such that depressions 60 (FIG. 4) are formed in the upstream face 56 and corresponding curved protrusions 62 (FIG. 3) are formed in the downstream face 58. Each protrusion 62 has a convex side 64 facing downstream and a concave side 66 facing upstream.

In one example, the ring-shaped body 42 includes a flange 70 formed about the outer periphery 52 and which extends in a downstream direction away from the body 42. A plurality of legs 72 extend from the flange 70 in a downstream direction. The legs 72 are circumferentially spaced apart from each other about the flange 70. Each leg 72 includes a first portion 74 that extends radially outward from the flange 70 and a second portion 76 that extends in the downstream direction to a distal end 78. A curved portion 80 transitions between the first 74 and second 76 portions.

Figure 5:
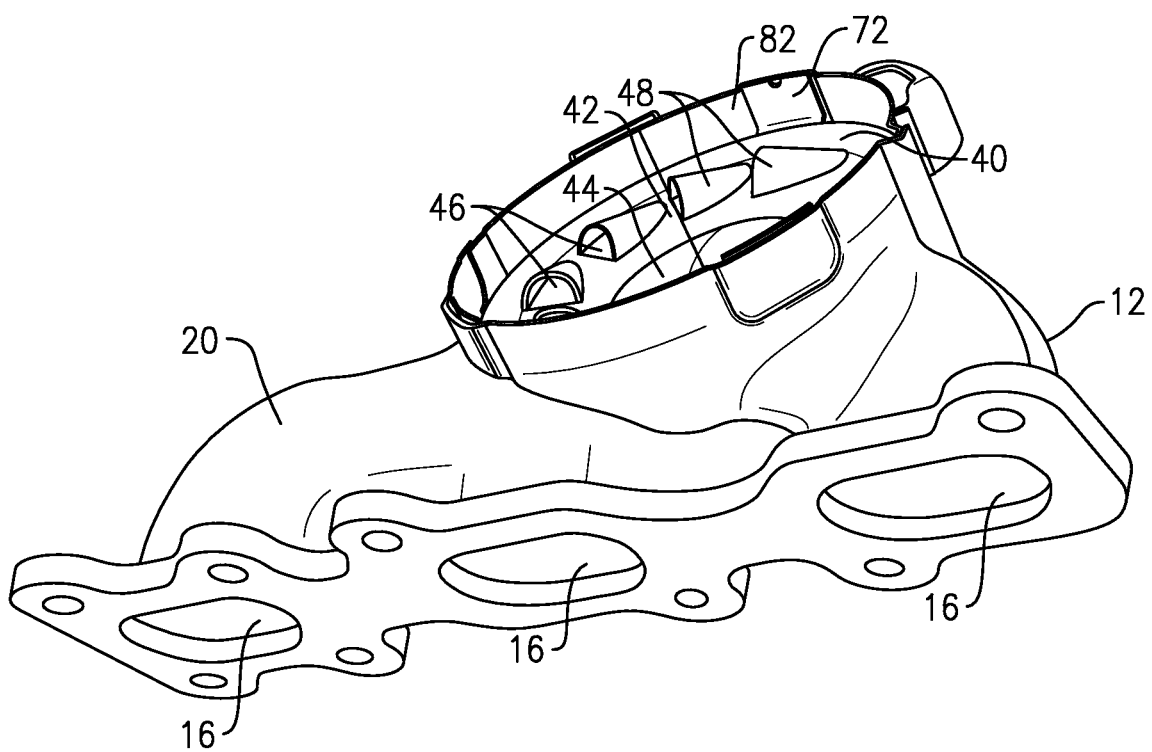
FIG. 5 is a perspective view of an inlet port side of an exhaust manifold and diffuser plate assembly.
Figure 6:
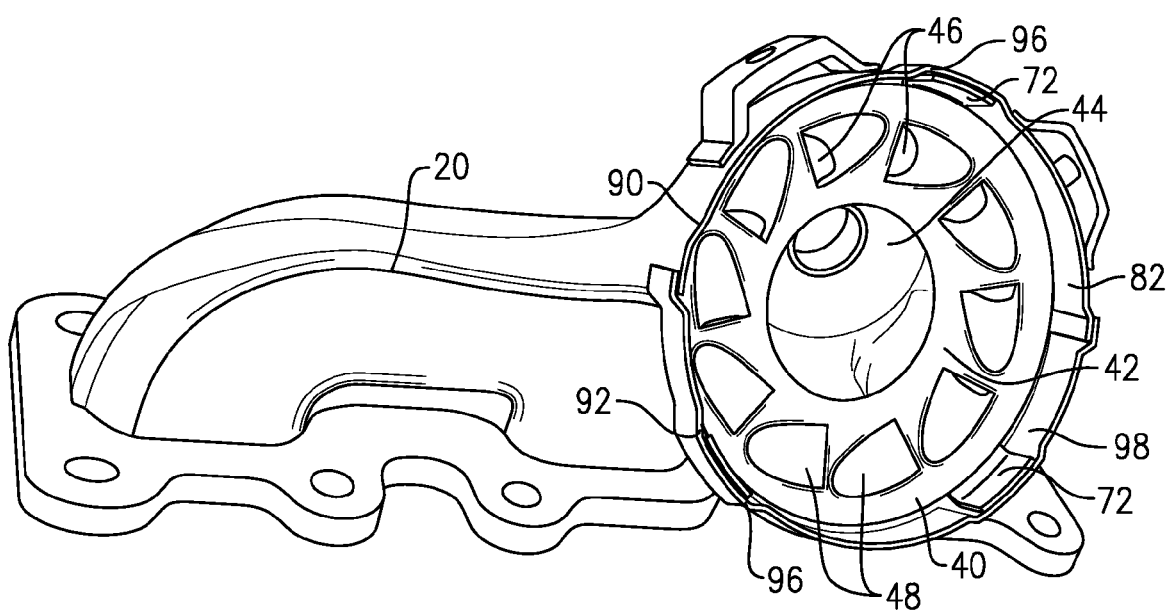
FIG. 6 is a perspective view of an outlet side of the assembly of FIG. 5.

The legs 72 are configured to be attached to the exhaust manifold housing 20. FIGS. 5-6 show the diffuser plate 40 as installed within the outlet 24 of the manifold outer housing 20. The legs 72 are attached to an inner surface 82 of the outer housing 20. The legs 72 can be welded, brazed, fastened, etc. to the inner surface 82.

In one example, the housing 20 is formed from a first shell 90 and a second shell 92 that are attached to each other (FIG. 6). The shells 90, 92 can be attached using any of various methods, including welding or brazing for example. The diffuser plate 40 is positioned within an internal cavity formed between the shells 90, 92 and an outer surface 94 (FIG. 4) of the second portion 76 of each leg 72 is attached to the inner surface 82. The shells 90, 92 may include depressions 96 to accommodate the legs 72. Due to the first portion 74 and curved portion 80 of the legs, when the diffuser plate 40 is attached to the housing 20, an outer periphery of the flange 70 is spaced radially inward of the inner surface 82 by a small air gap 98 (FIG. 6). This allows for any thermal expansion between the various components, i.e. shells 90, 92 and plate 40, to be easily accommodated.

Figure 7:
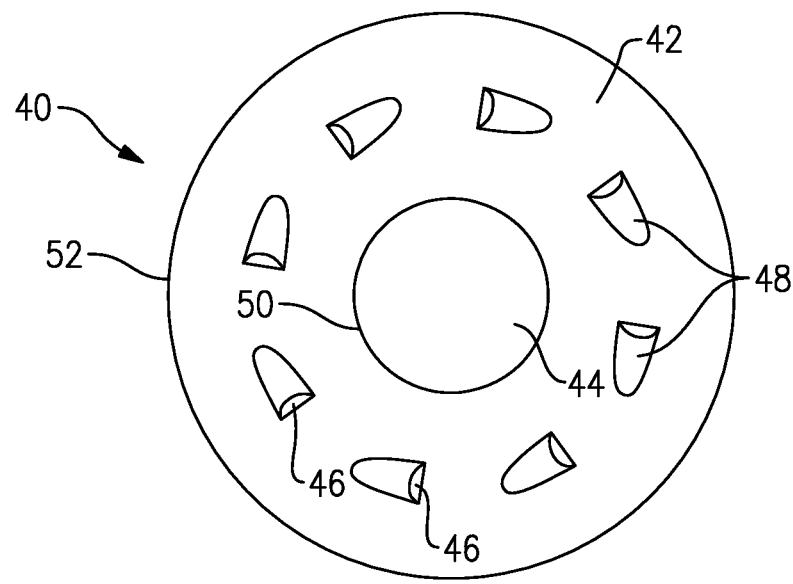
FIG. 7 is another example of a diffuser plate.

In another configuration shown in FIG. 7, the plate 40 may not include the legs and the ring-shaped body 42 could be directly attached to the inner surface 82 of the housing 20.

Figure 8:
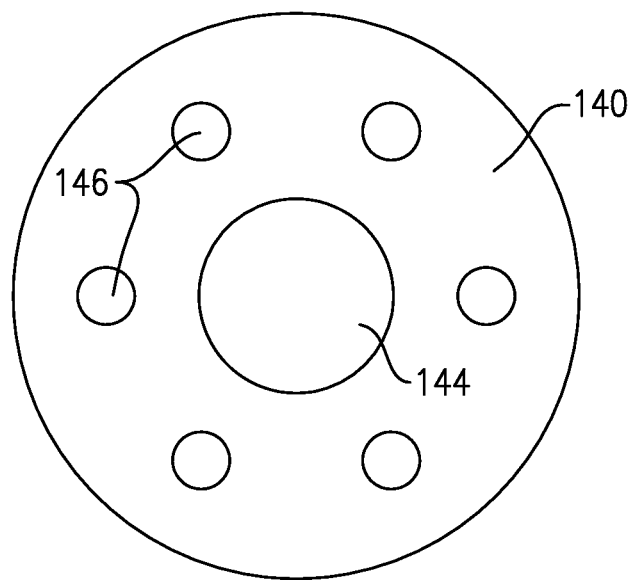
FIG. 8 is another example of a diffuser plate.

FIG. 8 shows another example of a diffuser plate 140 with a primary opening 144 and a plurality of secondary openings 146 circumferentially spaced apart from each other. The secondary openings 146 are smaller in size than the primary opening 144.

As shown in FIG. 1, the housing 20 includes a manifold sensor mount portion 100 that is located near the outlet 24. A first oxygen sensor S1 is coupled to this mount portion 100. The outlet pipe 38 includes a sensor mount portion 102 that is coupled to a second oxygen sensor S2.

The diffuser plate 40 is used to thoroughly mix and evenly distribute the exhaust gases across an entire surface of an inlet end 104 of the substrate 36, which increases catalyst utilization efficiency. Further, the diffuser plate 40 allows mixing and directing of exhaust gases from individual cylinder combustion events in a manner enabling the oxygen sensor (S1) to accurately measure each cylinder's exhaust gas chemistry accurately, resulting in increased fuel economy and catalyst efficiency. This allows customers to easily meet certain air quality requirements for the various respective vehicle models. Also, for configurations that include a substrate 36 wrapped with a mat 36a, the diffuser plate 40 prevents exhaust gases with high velocity from entering the mat region within the housing 28, and thus reduces the risk of mat erosion.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust system comprising:
   an exhaust manifold having a manifold outer housing with a plurality of ports configured for attachment to an engine;
   a catalytic converter having a converter housing with an inlet end configured for attachment to an outlet of the manifold outer housing, the converter housing defining an internal cavity;
   a substrate positioned within the internal cavity;
   a diffuser plate positioned upstream of the substrate and within the manifold outer housing, the diffuser plate having a primary opening and a plurality of secondary openings circumferentially spaced apart from each other about the primary opening; and
   wherein the manifold outer housing includes an inner surface that defines the outlet, and wherein the inner surface includes a plurality of depressions circumferentially spaced apart from each other, and wherein the diffuser plate includes a plurality of attachment legs with each leg being received in one depression of the plurality of depressions to directly attach the diffuser plate to the exhaust manifold.

2. The vehicle exhaust system according to claim 1, wherein the diffuser plate comprises a ring-shaped body with the primary opening comprising a single center opening that defines a center axis, and wherein the plurality of secondary openings comprise a plurality of louvers that are circumferentially spaced apart from each other about the center axis.

3. The vehicle exhaust system according to claim 2, including a flange formed about a periphery of the ring-shaped body and extending in a downstream direction.

4. The vehicle exhaust system according to claim 3, wherein the plurality of attachment legs extend from the flange in a downstream direction.

5. The vehicle exhaust system according to claim 4, wherein the plurality of attachment legs are fixed to the inner surface of the manifold outer housing such that an outer periphery of the flange is spaced radially inward of the inner surface.

6. The vehicle exhaust system according to claim 1, including an oxygen sensor positioned in the exhaust manifold, and wherein the primary opening and plurality of secondary openings cooperate to thoroughly mix and distribute exhaust gases across an entire inlet face of the substrate, and enable the oxygen sensor to measure engine cylinder gas chemistry via associated ports of the exhaust manifold.

7. The vehicle exhaust system according to claim 1, wherein the substrate is wrapped with a mat, and wherein the diffuser plate prevents high velocity exhaust gases from entering a mat region with the housing.

8. The vehicle exhaust system according to claim 1, wherein the diffuser plate comprises a ring-shaped body and the primary opening comprises a single center opening that defines a center axis, and wherein an outer periphery of the ring-shaped body includes at least one exhaust manifold abutment surface in direct abutment with the inner surface of the manifold outer housing.

9. The vehicle exhaust system according to claim 8, wherein the manifold outer housing includes a plurality of branch portions that extend to the outlet, wherein each branch portion is associated with one port of the plurality of ports and the outlet is common for each branch portion, and wherein the outlet directs exhaust gases directly into the inlet end of the converter housing.

10. The vehicle exhaust system according to claim 9, wherein the outlet of the manifold housing and the inlet end of the converter housing are concentric with the center axis.

11. The vehicle exhaust system according to claim 9, wherein the manifold outer housing comprises at least a first shell and a second shell that are attached to each other to define an internal cavity, and wherein the diffuser plate is enclosed within the internal cavity.

12. The vehicle exhaust system according to claim 9, wherein the diffuser plate is positioned within the outlet directly between the branch portions and the substrate.

13. The vehicle exhaust system according to claim 9, wherein the exhaust manifold abutment surface extends entirely about the ring-shaped body.

14. The vehicle exhaust system according to claim 9, wherein the exhaust manifold abutment surface comprises at least one leg extending from the outer periphery of the ring-shaped body.

15. The vehicle exhaust system according to claim 1, wherein the diffuser plate comprises a ring-shaped body and the primary opening comprises a single center opening that defines a center axis, and including a flange formed about an outer periphery of the ring-shaped body and extending in a downstream direction, and wherein the plurality of attachment legs extend from the flange in a downstream direction.

16. The vehicle exhaust system according to claim 15, wherein each attachment leg includes a first portion that extends radially outward from the flange and a second portion that extends in the downstream direction to a distal end.

17. The vehicle exhaust system according to claim 16, wherein each attachment leg includes a curved portion transitions between the first and second portions.

18. The vehicle exhaust system according to claim 15, wherein, when the diffuser plate is installed within the exhaust manifold, an outer periphery of the flange is spaced radially inward of the inner surface of the manifold outer housing by an air gap.

19. The vehicle exhaust system according to claim 15, wherein the flange extends entirely about the outer periphery.

* * * * *